(12) United States Patent
Bahnasy et al.

(10) Patent No.: US 12,463,905 B2
(45) Date of Patent: Nov. 4, 2025

(54) SYSTEM AND METHODS FOR NETWORK-AWARE RATE ADJUSTMENT

(71) Applicant: HUAWEI TECHNOLOGIES CO., LTD., Shenzhen (CN)

(72) Inventors: Mahmoud Mohamed Bahnasy, Kanata (CA); Seyed Hossein Mortazavi, Kanata (CA); Ali Munir, Kanata (CA); Yashar Ganjali, Kanata (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 18/233,156

(22) Filed: Aug. 11, 2023

(65) Prior Publication Data

US 2025/0055800 A1 Feb. 13, 2025

(51) Int. Cl.
H04L 47/24 (2022.01)
H04L 47/11 (2022.01)
H04L 47/28 (2022.01)

(52) U.S. Cl.
CPC ............ H04L 47/24 (2013.01); H04L 47/115 (2013.01); H04L 47/28 (2013.01)

(58) Field of Classification Search
None
See application file for complete search history.

(56) References Cited

U.S. PATENT DOCUMENTS 7,149,664 B1 * 12/2006 Firoiu .................. H04L 47/32
  703/22
2006/0092840 A1 * 5/2006 Kwan ................... H04L 47/31
  370/230.1
2013/0308455 A1 * 11/2013 Kapadia ............... H04L 47/125
  370/235
2014/0119193 A1 * 5/2014 Anand .................. H04L 47/125
  370/237
2016/0294698 A1 * 10/2016 Berberana Fernandez-Murias .....
  H04L 47/12

OTHER PUBLICATIONS

Performance Comparison of Router Assisted Congestion Control Protocols: XCP vs. RCP, M Proebster et al., Mar. 6, 2009.
ExpressPass: End-to-end credit-based congestion control for datacenters, I Cho et al., Oct. 15, 2016.
Data center TCP (DCTCP), M Alizadeh et al., 2010.
Host-Assisted Transport Layer in Datacenters Using Network-Aware Rate Adjustment, M Bahnasy et al., Feb. 7, 2023.

* cited by examiner

*Primary Examiner* — Mohamed Ibrahim

(57) ABSTRACT

The disclosure may provide methods, systems and apparatus related to a switch-assisted transport layer using network-aware rate adjustment. According to an aspect, a method by a network device may be provided. The method includes receiving one or more data packets corresponding to one or more flows to be forwarded through an egress port of the network device. Each data packet may indicate a flow demand per time period T for a corresponding flow of the one or more flows. The method further includes determining a demand value for the egress port based on the indicated flow demand. The method further includes sending the one or more data packets through the egress port. Each data packet sent may indicate a value for an aggregated demand of the corresponding flow, The value for the aggregated demand may be based on the determined demand value.

19 Claims, 14 Drawing Sheets

Method 200: Calculation of $D$ at a network device

Input: Omni-TM Header
Output: $D$

201 Function Main(*Omni-TM Header*):
202     *lastCalcTime*, $D_s \leftarrow 0$;
203     forall *pkt.has(Omni-TM Header)* do
204         $d$ = *pkt.parseHeader()*;
205         $D_s\mathrel{+}=d/C$;
206         if *nowTime()* > (*lastCalcTime* + $T$) then
207             $D \leftarrow \alpha \cdot \dfrac{D_s + Q_{Len}/(T \cdot C)}{\eta} + (1-\alpha) \cdot D$;
                /* Reset params, new cycle */
208             *lastCalcTime* $\leftarrow$ *nowTime()*;
209             $D_s \leftarrow 0$;
210         if $D > $ *pkt.getD()* then
211             *pkt.addToHeader(D)*;
212         *process packet(pkt)*;

901. Receiving a plurality of data packets corresponding to a plurality of flows to be forwarded through the egress port of the network device, each data packet of the plurality of data packets indicating a flow demand per the time period T for a corresponding flow of the plurality of flows

902. Determining, for the time period T, an aggregated demand value for the egress port according to an exponentially weighted moving average based on the flow demand of the plurality of flows and without keeping a state of the plurality of flows at once

903. Sending the plurality of data packets through the egress port, each of the plurality of data packets indicating a value for an aggregated demand of the corresponding flow of the plurality of flows, the value for the aggregated demand being based on the determined aggregated demand value

1001. sending, by a source host, at a first transmission rate at a first time T1, a first data packet of a flow indicating a flow demand corresponding to the flow

1002. Receiving, by the source host, an acknowledgment (ACK) packet indicating a value for an aggregated demand of a plurality of flows forwarded through an egress port of a network device, the plurality of flows including the flow, the value determined according to an exponentially weighted moving average based on a plurality of flow demands corresponding to the plurality of flows without keeping a state of the plurality of flows at once at the network device, the plurality of flows including the flow demand

FIG. 10

SYSTEM AND METHODS FOR NETWORK-AWARE RATE ADJUSTMENT

CROSS-REFERENCE TO RELATED APPLICATIONS

This is the first application filed for the present invention.

FIELD OF THE INVENTION

The present invention pertains to datacenters (DCs) or DC networks and in particular to methods, systems and apparatus related to a switch-assisted transport layer using network-aware rate adjustment.

BACKGROUND

Next generation applications for DCs, such as Distributed Machine Learning (DML) applications and Big Data applications, have complex communication patterns that demand a scalable, stateless and application-aware optimal transport protocol to maximize network utilization and improve application performance. However, existing congestion protocols, e.g., the transmission control protocol (TCP), have several limitations, a major one being slow recovery of available bandwidth in the network. Further, recent transport or congestion protocols either provide limited benefits or implement complex stateful mechanisms. Overall, these limitations, including slow recovery of available bandwidth, can have detrimental effects on network performance, throughput, latency, resource utilization, and fairness.

Therefore, there is a need for methods, systems and apparatus related to a switch-assisted transport layer using network-aware rate adjustment that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

The disclosure may provide for methods, systems and apparatus related to a switch-assisted transport layer using network-aware rate adjustment. According to an aspect, a method may be provided. The method may be performed by a network device having an egress port. The method may include receiving a plurality of data packets corresponding to a plurality of flows to be forwarded through the egress port of the network device. The network device may receive the plurality of data packets from other network devices (e.g., source hosts). Each data packet of the one or more data packets may indicate a flow demand per time period T for a corresponding flow of the one or more flows. The method may further include determining, for the time period T, an aggregated demand value for the egress port according to an exponentially weighted moving average based on the flow demand of the plurality of flows and without keeping a state of the plurality of flows at once. The method may further include sending the plurality of data packets through the egress port. Each of the plurality of data packets may indicate a value for an aggregated demand of the corresponding flow of the plurality of flows. The value for the aggregated demand may be based on the determined aggregated demand value. The network device may send the one or more data packets to one or more network devices (e.g., destination hosts) corresponding to the one or more flows. The method may allow for improved link utilization and improved resource utilization.

The value for the aggregated demand may be the determined aggregated demand value if the determined aggregated demand value is greater than an existing value for the aggregated demand in said each packet. The value for the aggregated demand may be the existing value for the aggregated demand in said each packet if the determined demand value is less than or equal to the existing value.

The method may further include receiving one or more acknowledgment (ACK) packets corresponding to the plurality of data packets. Each ACK packet may indicate the value for the aggregated demand of the corresponding packet of the one or more data packets. The network device may receive the one or more ACK packets from the one or more destinations hosts. The method may further include sending the one or more ACK packets. The network device may send the one or more ACK packets toward to the one or more source hosts.

Each of the plurality of flows may correspond to a different one of a plurality of source hosts and the plurality of destination hosts. The determined aggregated demand value may be based on an aggregation of the flow demand of the one or more flows.

The determined aggregated demand value may be updated based on a link utilization factor, $\eta$, set according to $U_{Desired} < \eta < 1/U_{current}$, where $U_{Desired}$ is a desired link utilization at the egress port and $U_{current}$ is a current link utilization at the egress port.

Each of the plurality of packets may include a field for indicating the value for the aggregated demand. Each of the plurality of data packets may include a field for indicating the value of the aggregated demand. Each of the plurality of data packets may include header indicating the flow demand of the corresponding flow of the plurality of flows. The header may correspond to a transport mechanism layer of an associated protocol stack. The associated protocol stack may exclude or include one or both of: a transmission control protocol (TCP) layer and a user datagram protocol (UDP) layer.

According to another aspect, another method may be provided. The method may include sending, by a source host, at a first transmission rate at a first time T1, a first data packet of a flow indicating a flow demand corresponding to the flow. The method may further include receiving, by the source host, an acknowledgment (ACK) packet indicating a value for an aggregated demand of a plurality of flows forwarded through an egress port of a network device. The plurality of flows include the flow, the value determined according to an exponentially weighted moving average based on a plurality of flow demands corresponding to the plurality of flows without keeping a state of the plurality of flows at once at the network device, the plurality of flows including the flow demand.

The flow demand may be a demand for a next, subsequent or future time period T. The method may further include sending, by the source host, at a second transmission rate at a second time T2, a second data packet of the flow. The second transmission rate may be based on the flow demand and the value for the aggregated demand. The second time T2 may be one time period T after the first time T1. The one time period T may be one round trip time (RTT).

The second transmission rate may be determined according to:

$$\text{second transmission rate} = \frac{1}{D} \times \frac{d}{T},$$

where D is the value for the aggregated demand; d is the flow demand; and T is a cycle time based on the one time period T.

According to another aspect, an apparatus is provided. The apparatus includes modules configured to perform one or more of the methods and systems described herein.

According to another aspect, an apparatus is provided. The apparatus includes an input port configured to receive a plurality of packets corresponding to a plurality of flows. Each data packet of the plurality of data packets indicates a flow demand per the time period T for a corresponding flow of the plurality of flows. The apparatus also includes an egress port and processing electronics. The processing electronics is configured to: determine, for the time period T, an aggregated demand value for the egress port according to an exponentially weighted moving average based on the flow demand of the plurality of flows and without keeping a state of the plurality of flows at once. The processing electronics is also configured to send the plurality of data packets through the egress port, each of the plurality of data packets indicating a value for an aggregated demand of the corresponding flow of the plurality of flows, the value for the aggregated demand being based on the determined aggregated demand value.

According to one aspect, an apparatus is provided, where the apparatus includes: a memory, configured to store a program; a processor, configured to execute the program stored in the memory, and when the program stored in the memory is executed, the processor is configured to perform one or more of the methods and systems described herein.

According to another aspect, a computer readable medium is provided, where the computer readable medium stores program code executed by a device and the program code is used to perform one or more of the methods and systems described herein.

According to one aspect, a chip is provided, where the chip includes a processor and a data interface, and the processor reads, by using the data interface, an instruction stored in a memory, to perform one or more of the methods and systems described herein.

Other aspects of the disclosure provide for apparatus, and systems configured to implement the methods according to the first aspect disclosed herein. For example, wireless stations and access points can be configured with machine readable memory containing instructions, which when executed by the processors of these devices, configures the device to perform one or more of the methods and systems described herein.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 2 illustrates a method for operations of Omni-TM at a network device, according to an aspect.

FIG. 9 illustrates a method by a network device, according to an aspect.

FIG. 10 illustrates a method by a source host, according to an aspect.

It will be noted that throughout the appended drawings, like features are identified by like reference numerals.

DETAILED DESCRIPTION

Figure 1:
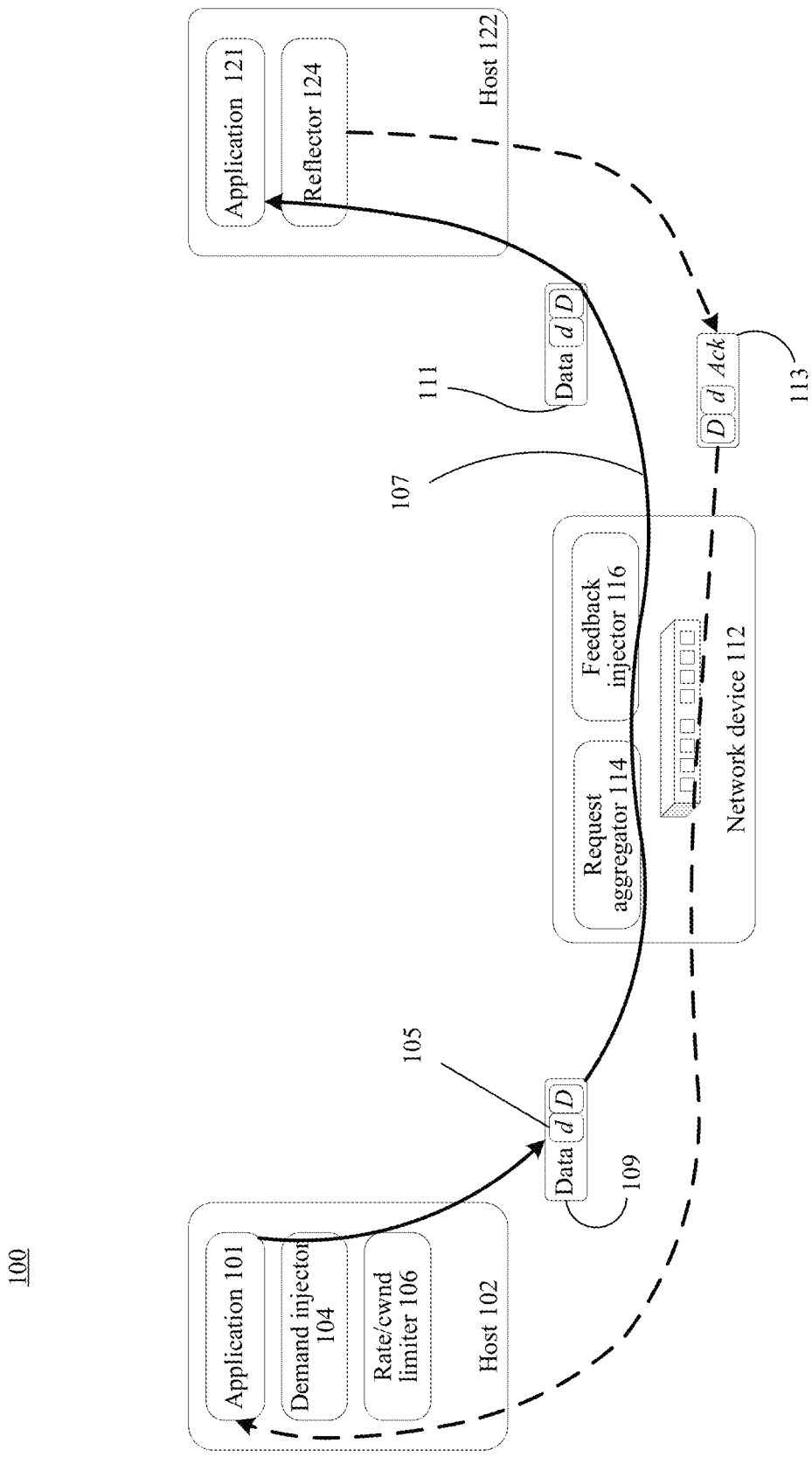
FIG. 1 illustrates Omni-TM's architecture, according to an aspect.

The disclosure may provide for methods, systems and apparatus related to a switch-assisted transport layer using network-aware rate adjustment. According to an aspect, a method 900 may be provided. The method 900 may be performed by a network device having an egress port. The method 900 may include receiving 901 a plurality of data packets corresponding to a plurality of flows to be forwarded through the egress port of the network device. Each data packet of the plurality of data packets may indicate a flow demand per time period T for a corresponding flow of the plurality of flows. The method 900 may further include determining 902, for the time period T, an aggregated demand value for the egress port according to an exponentially weighted moving average based on the flow demand of the plurality of flows and without keeping a state of the plurality of flows at once. The method 900 may further include sending 903 the plurality of data packets through the egress port, each of the plurality of data packets indicating a value for an aggregated demand of the corresponding flow of the plurality of flows, the value for the aggregated demand being based on the determined aggregated demand value.

According to another aspect, another method 1000 may be provided. The method 1000 may include sending 1001, by a source host to a network device, at a first transmission rate at a first time T1, a first data packet of a flow indicating a flow demand corresponding to the flow. The method 1000 may further include receiving 1002, by the source host, an acknowledgment (ACK) packet indicating a value for an aggregated demand of a plurality of flows forwarded through an egress port of a network device, the plurality of flows including the flow, the value determined according to an exponentially weighted moving average based on a plurality of flow demands corresponding to the plurality of flows without keeping a state of the plurality of flows at once at the network device, the plurality of flows including the flow demand.

Next generation applications for DCs, such as Distributed Machine Learning (DML) applications and Big Data applications, have complex communication patterns that demand a scalable, stateless and application-aware optimal transport protocol to maximize network utilization and improve application performance. Recent transport protocols either provide limited benefits due to lack of information sharing between application and network, or implement complex stateful mechanisms to improve the application performance.

The transmission control protocol (TCP) has been the most used congestion protocol in data communication. However, the TCP has many limitations, a major one being its slow behavior in recovering available bandwidth in the network. To tackle such limitations, several congestion protocols have been proposed in the literature. Two categories of these protocols include: an explicit feedback congestion control category, and a credit-based congestion control category.

Some older congestion control protocols such as the explicit Control Protocol (XCP) and the Rate Control Protocol (RCP) use explicit feedback. XCP and RCP may provide faster and easier congestion control compared to TCP. RCP uses rate mismatch and queue size to estimate the flow rate. XCP uses explicit feedback from routers to guide endpoint transmission rates while attempting for near-optimal capacity utilization. While packets are traveling within a feedback loop, XCP enabled routers can alter the throughput values in the header to achieve the desired results for the congestion window size. The changes in the congestion window are then reflected on the next packet to be sent through the reverse feedback loop.

Although there are benefits to both XCP and RCP, research studies suggest that RCP outperforms XCP. There are several reasons resulting in this conclusion, including XCP being more complex than RCP to set up and process. XCP requires a large number of per packet computations at each router. Further, XCP's convergence to fairness is slower than that of RCP. Another drawback noticed is that XCP enabled routers are usually limited due to their synchronization issues.

Existing transport protocols rely on estimating network state to adjust the application transmission rate. In these models, the switches serving the data traffic are unaware of their characteristics or requirements. On the other hand, some approaches leverage certain flow information (such as flow size or deadline) to improve Flow Completion Time (FCT). However, existing approaches remain limited as they are oblivious to the application's demands and/or communication patterns. In addition, they may require keeping a per-flow state at the switches.

According to an aspect, an improved transport mechanism or protocol, which may be referred to as Omni-Transport Mechanism (Omni-TM), may be provided as a message-based congestion control protocol. Omni-TM may allow for exchanging one or more messages (comprising relevant information) with the network to negotiate an improved transmission rate without maintaining a per-flow state at the switches (i.e., stateless). Omni-TM may allow for increased or improved link capacity in one shot (e.g., in one time period) as described herein. In some aspects, Omni-TM may allow for improved traffic control decisions which may further allow for reduced queue length (e.g., close to zero queue length) while maintaining high link utilization. Furthermore, Omni-TM may allow for improved (e.g., reduced) Flow Completion Time (FCT) based on realistic workload (e.g., up to 45% when compared to FCT of DC TCP (DCTCP) as illustrated in FIG. 8A to 8D).

Omni-TM may provide several benefits over RCP. In RCP, each router maintains a single fair-share rate, R, for all flows. In Omni-TM, each network device (e.g., switch or router) may calculate a feedback based on the maximum rate that a flow can use for transmission. RCP uses a previous rate R to estimate the number of flows (N=C/R), where C is the link capacity. Hence, RCP iteratively updates R to reach the maximum link capacity. In Omni-TM, the network device may calculate the rate based on a locally calculated value that represent the application request. Therefore, Omni-TM may obviate the need to estimate the flow number and all flows reach their fair share in "one shot" (referring to one calculation step where the flows reach their fair share in one time period T (e.g., one Round Trip Time (RTT)). In addition, RCP calculates R by dividing the available bandwidth capacity equally among all active flows. This assumes that all active flows have enough data to send. However, DC applications exhibit highly dynamic on and off characteristic in nature. Hence, RCP may assign a rate for a flow that is not going to be used because the flow may be application-limited which may result in resource underutilization. On the other hand, Omni-TM does not face such an issue as it considers application-limited traffic in the design, as described herein.

As may be appreciated, a host may be unable to send more than the available data in its buffer even if the switch allows it. Thus, Omni-TM may obviate the need to perform rate increase. Hence, Omni-TM may resolve two major issues facing RCP: the increase is already taken care of by the host adding the information of its maximum capability; and application-limited flows are also resolved as described herein.

Some prior art approaches, based on re-architecting DC networks and stacks, introduce a receiver driven poll mechanism. However, the drastic changes required hinder it difficult to deploy. Some prior art approaches, e.g., ExpressPass (an end-to-end credit-based congestion control) also present a receiver driven credit based mechanism. ExpressPass uses 5% of link capacity for credits on the assumption that data packets have a size≈1538 Bytes. Hence, for flows of shorter packet sizes and small number of packets, ExpressPass suffers from credit loss, consequently, resource underutilization. Further, in a multi-bottleneck scenario, ExpressPass may lead to underutilization of resources due to credit throttling occurring at multiple congestion points. In addition, ExpressPass requires symmetric data paths for inward and backward traffic.

Some prior art approaches are based on a receiver-driven transport protocol using opportunistic transmission. These prior art approaches also present a receiver driven credit based mechanism. Further, these prior art disclosures are designed to use low-priority opportunistic packets to ensure high network utilization. These approaches also require symmetric data paths for inward and backward traffic.

Some prior art approaches, e.g., port control protocol (PCP), propose extracting flow-level information from the application to design better congestion control. However, PCP requires involvement from the application layer and does not provide a "one shot" rate adjustment as may be achieved via Omni-TM.

DC network providers have long anticipated scalable, stateless and application-aware optimal transport networks that can reach full link capacity in one shot (e.g., one Round Trip Time (RTT)). Existing transport protocols rely on estimating network state to adjust the application transmission rate. In these models, switches serving data traffic are unaware of their characteristics or requirements. On the other hand, some approaches leverage certain flow information (such as flow size or deadline) to improve FCT. However, these approaches remain limited as they are oblivious to one or both of the application's demands and communication patterns. In addition, these approaches may require keeping a per-flow state at the switches.

As may be appreciated, network capacity is not often the bottleneck in Distributed Neural Network (DNN). This may be due to the on and off or bursty communication patterns of these applications. As the network is generally unaware of the state of the application and what comes next from the application, it cannot sufficiently plan and prepare the network for the incoming traffic and has to generally over-provision resources to prevent performance degradation. Therefore, the network transport layer may be optimized or improved, by controlling flow transmission rates to consider both the application requirements and network state, which may further improve the application performance and its scalability.

Some studies in Network-Application Integration (NAI) indicate that the advanced knowledge of the application's traffic patterns and requirements in a DC can be leveraged to improve resource utilization and performance. However, these approaches generally have limited scalability as they require a centralized processing component which will fail to scale as the number of hosts and switches increases. In addition, they require prior knowledge of traffic characteristics.

As may be appreciated, a true NAI scalable approach should also involve the switches to be feasible in a DC. According to an aspect, a transport network may be provided that allows the network and applications to work together to improve resource utilization. The transport mechanism may share relevant information (as described herein) between the application and the network. The transport mechanism may allow for a scalable and stateless communication mechanism between the application and the network.

According to an aspect, the Omni-TM may allow coordination between the network devices (e.g., network switches) and the application, in a distributed and stateless manner, to reach an improved link capacity in one shot. In some aspects, Omni-TM may be designed to be a message-based congestion control mechanism. Omni-TM may allow for ultra-low latency (i.e., close to zero queue length) and high throughput.

According to an aspect, one or more applications in Omni-TM may provide information about the message size or Congestion Window (cwnd) to one or more network devices (e.g., switches). Using message size or cwnd may be a practical approach because they are readily available at the end-host (transport and application layers). As such, some aspects may apply NAI on DC switches in a distributed and stateless manner, where no central unit is required (i.e., distributed) and without keeping a per-flow state at the switches (i.e., stateless).

In some aspects, in Omni-TM, one or more network devices (e.g., switches, routers) may aggregate flow demands, over a control interval T, and share a representative feedback signal with the end-hosts for better rate adaptation.

In some aspects, Omni-TM may use an in-band signaling approach to convey application requests. Omni-TM may further allow one or more network devices (e.g., switches, routers) to guide applications' transmission behavior to allow for improved ultra-low latency (i.e., close to zero queue length and high throughput).

In some aspects, Omni-TM may allow for one-step rate adaptation. According to an aspect, Omni-TM may allow a host to change its transmission rate in the next time window (e.g., one time period, RTT) to reach a fair share. Therefore, Omni-TM may obviate the need to iteratively change the rate to reach the fair share, and hence, rate adaptation can be done in one step.

Omni-TM may be scalable due to the distributed aggregation mechanism at one or more network devices (e.g., switches, routers, and the like). In some aspects, in one calculation step, Omni-TM may allow for determining or calculating the maximum allowed rate to saturate a data path upon receiving feedback from the network. Omni-TM may maintain low computational overhead on network devices as it has a limited memory fingerprint while fulfilling the applications' demands.

In some aspects, Omni-TM may allow for the integration between the applications and the network to negotiate the optimal transmission rate in a stateless manner.

According to an aspect, a method may be provided to obtain a feedback signal calculated at one or more network device (e.g., switches, routers) along the data path. This signal may be used to control flow transmissions to achieve improved link capacity within one RTT.

In some aspects, Omni-TM may be designed with the consideration that it can be tuned to satisfy different optimization objectives. In some aspects, Omni-TM may be implemented without changing or modifying the applications.

Omni-TM may allow for improved performance (e.g., lower FCT) compared to existing mechanisms (e.g., DCTCP). For example, Omni-TM may yield better rate adaptations as well as better traffic control decisions compared to existing mechanisms.

According to an aspect, the design and implementation details of a proposed protocol are described herein. The disclosure may further provide some evaluation and experimental results of one or more aspects for illustrative purposes.

DC networks have certain characteristics that affect the operation of the congestion control algorithm. For example, DC networks have homogeneous and low RTTs (tens of µs) in the absence of queuing. Moreover, the nature of traffic in DC networks is very dynamic and heterogenous with a diverse mix of short and long flows.

According to an aspect, a network device (e.g., a network switch or router) may aggregate information provided by all active flows while avoiding keeping a per-flow state, hence the network device operating as a stateless network device. According to an aspect, a feedback signal may be provided, e.g., by a network device, to one or more hosts involved to control their transmission rate. According to an aspect, one or more applications may share their demands with one or more network devices in terms of the maximum number of bytes to send within a fixed time period T. The one or more network devices may confirm if the shared demand can be satisfied given the network condition and the state of active flows. In some aspects, congestion may be monitored and one or more flows may be requested to change their rates based on a factor that can improve link utilization.

As may be appreciated, one or more applications' demands can be extracted in different ways. For example, an application may provide its demand directly. Another way may be using a prediction module to estimate the next RTT request. Also, a TCP layer may provide information, e.g., message size or buffer size, indicative of an application's demand.

According to an aspect, one or more application's demands may be extracted via the TCP layer when the TCP layer provides message size and buffer size. Using the TCP layer to extract an application's demand may facilitate implementation and avoid modifying the application.

An example may be described to illustrate improved link utilization in one processing step regardless of the application-limited traffic. In an example, 3 flows are assumed to request to send data with a desired transmission rate d, $d=x \cdot C$, where C is the link capacity, and x is a multiplication factor comprised between 0 and 1. Here, d may represent a desired or intended transmission rate in the next time period T. A network device (e.g., a switch) which may receive and forward the flows to their destination, may calculate the aggregated demand as $D=3x$ and convey it to the one or more host associated with the 3 flows. Here, D does not represent link utilization. Instead, D represents the expected utilization if all flows send data with their desired demands. Upon receiving D, each host may change (e.g., reduce) its rate by dividing by D. Hence, the new rates can be calculated as follows:

$$R_{new} = \frac{d}{D} = \frac{x \cdot C}{3x} = \frac{C}{3}.$$

In the next step (e.g., next time period T), all three flows may start sending with ⅓ of the link capacity at once and saturate the link in "one shot". Omni-TM assumes all flows are trustworthy (i.e., do not falsify their demands).

According to an aspect, an Omni-TM design may be described. FIG. 1 illustrates an embodiment of an Omni-TM architecture, according to the present disclosure. The Omni-TM architecture 100 may comprise one or more source hosts 102, one or more network devices 112 (e.g., network switch or router) and on one or more destination hosts 122. Each of the one or more source hosts may correspond to a destination host of the one or more destination hosts. Each of the source host 102 and its corresponding destination host 122 may run an application 101 and 121 respectively (where application 101 and 121 may be the same or different). Each of the source hosts 102 may comprise one or more components including, for example, a demand injector 104 and a rate or cwnd limiter 106. Each network device 112 may comprise one or more components including, for example, a request aggregator 114 and a feedback injector 116. Each of the destination host 122 may comprise a reflector component 124.

According to an aspect, one or more flows may exit an egress port of the network device 112. Omni-TM may allow for adjustment of the transmission rate of each of the one or more flows exiting the egress port of the network device for improved link utilization. Each of the one or more flows may correspond to a source host 102 of the one or more source hosts and a destination host 122 of the one or more destination hosts. For example, flow 107 may correspond to the source host 102 and to the destination host 122.

According to an aspect, the one or more source hosts, corresponding to the one or more flows exiting the egress port of the network device 112, may share their demands, d 105 with the network device. For example, the source host 102 may share its demand (or flow demand)—i.e., the amount of data to be transferred within the next time cycle—to the network device 112. In some embodiments, the demand (or flow demand), d, may be represented as the maximum bytes to be transmitted (e.g., TxBytes) in a time period T. That is, d=Message.size/T=TxBytes/T. The time period T may be one RTT, for example. The flow demands may be shared using a customized in-band Network Telemetry (INT) header, a TCP optional header, or a header extension (e.g., IPv6 header extensions). The flow demand may be added, by the demand injector 104, to a packet 109 to be sent to the network device 112.

According to an aspect, Omni-TM may be adapted to use the information available at the transport layer, namely the buffer size. In some embodiments, the one or more hosts 102 may set the demand according to: d=min (C, max (TxBytes/T, minRate)), where minRate=C/100. This approach to setting the flow demand may be practical as it simply requires minor changes to the transport layer and no modification to the applications.

According to an aspect, for each flow of the one or more flows exiting the egress port of the network device, a flow demand may be added via the corresponding source host. The flow demand may be added once per each time period T. The length of T may be a period agreed by all the one or more flows (i.e., their corresponding hosts). The time period T may represent the minimum length of the control loop, and hence, the time period T may be greater than or equal to one RTT. In some embodiments, T may be set to the maximum physical round trip latency, with no queuing, in the DC.

At the network device 112, the request aggregator 114 may calculate or determine a total or aggregated demand D, at the beginning of each calculation cycle (which may be triggered by the existence of Omni-TM header). The determined aggregated demand D may be the total demand at the egress port of the network device 112. In an embodiment, D may be calculated by summing up all flow demands. Thereafter, the feedback injector 116 may piggyback the determined demand D signal on the received data packets only if the newly calculated D is higher than the value existing in the packet that is calculated at an upstream network device (e.g., switch). A switch can have multiple input ports and multiple egress ports. In some embodiments, the network device is a first switch in a data path, and thus the switch may aggregate subset of flows in one egress port. In some embodiments, one flow is directed to one egress port, and thus, D=d.

The network device 112 may then send the packet 111 to the destination host 122. The destination host 122 may send an acknowledgment (ack) packet 113 to the network device 112, which forwards the ack packet to the source host 102. At the source host 102, D is used to control the transmission rate for the flow 107 in order to reach the maximum link capacity in one shot. For example, the source host 102 may adjust the transmission rate of the flow 107 in the next cycle (as may be determined by T time period after sending the packet 105, one RTT). As may be appreciated, the Omni-TM architecture may involve more than one flow exiting the egress port of the network device 112. Similarly, the Omni-TM architecture may involve more than one of each network entity including source hosts, network devices 112, and destination hosts.

FIG. 2 illustrates an embodiment of a method for operations of Omni-TM at a network device (e.g., switch, router and the like), according to the present disclosure. According to an aspect, the network device 112 may perform the method 200. The method may include, for each packet that has Omni-TM header, reading the flow demand, d, included in the packet (line 203. The method may further include aggregating the flow demands (lines 203 to 205 in FIG. 2). Further, d may be normalized by diving by C (being the link capacity at the switch) which allows Omni-TM to operate with different link capacities. The method may further include, at line 206, defining the end of each cycle and trigger the calculation of D. The method may further include, at line 207, adding ($Q_{Len}/(T \cdot C)$) to $D_s$, where $Q_{Len}$ represents the queue length, to drain any packet accumulation in the queue. As may be appreciated, factors $\alpha$ and (1-$\alpha$) may be used as a smoothing technique for the D value. Further, as illustrated, the numerator is divided by a factor $\eta$ which is used to maintain link utilization under a certain threshold. In some embodiments $\eta$ may be initialized to 0.95 which allows to limit the link utilization to 95%. In some aspects, Exponentially Weighted Moving Average (EWMA) may be adopted in calculating D to avoid waiting for 2·RTT for the aggregation process. In some aspects, $\alpha$=0.9 in the calculation of the EWMA. As will be understood by the skilled worker, adopting the EWMA in calculating D may give more importance to new values over old values and slowly converge to an average value (e.g., EWMA at time/being about equal to EWMA at time t−1). For a data set $\{x_t\}$ with t being an integer comprised between 0 and n:

$$EWMA_t = \alpha x_t + (1 - \alpha)EWMA_{t-1}$$

$$EWMA_t = \alpha(x_t + \ldots + (1-\alpha)^{t-2} \times x_2 + (1-\alpha)^{t-1} \times x_1) = \alpha \sum_{i=1}^{t}(1-\alpha)^{t-i} \times x_i$$

The method may further include, at 210 and 211, updating the packet header with D if the new value is bigger than the value added by a previous switch. Further, the switch may proceed with normal packet processing at 212.

Referring to FIG. 1, at the receiver side (the destination host), the reflector 124 may extract D from data packets, e.g., packet 111, and sends it, via Ack 113, back to the sender (source hosts). The Omni-TM aims to maintain the normalized aggregated demands D≤1. To that end, the rate/cwnd limiter 106 may react by verifying if the requested flow rate could cause congestion, i.e., could lead to D>1.

Hence, the source host may calculate the cwnd for the next RTT as follows:

$$\text{If } (D > 1): cwnd = \frac{1}{D} \cdot d \cdot RTT + AI \quad (1)$$

In some aspects, the additive increase behavior of traditional TCP may be maintained to enhance the fairness for flows with very low demand. Hence, an Additive Increase (AI) term may be added as illustrated in Equation (1).

By substituting the value of D in Equation (1) and ignoring the additive increase part, the overall link utilization in the second cycle can be calculated as $$\sum U_{next} \approx \frac{\eta \cdot C}{\sum d} \cdot \sum d = \eta \cdot C.$$

Hence, a link capacity of $\eta$=95% may be achieved in one shot (e.g., one RTT). One can notice that Omni-TM does not require the slow start phase as it reaches the maximum resource utilization in one shot. As may be appreciated by a person skilled in the art, in some aspects, the host can start sending with the maximum rate at the first RTT while allowing the switches to drop unscheduled (pre-agreement packets) when bandwidth is used up. This approach allows Omni-TM to send data at the first RTT which avoid resource waste.

Figure 3:
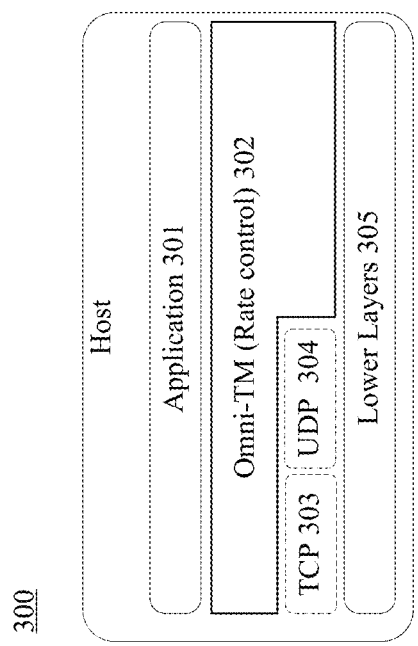
FIG. 3 illustrates Omni-TM in a protocol stack, according to an aspect.

In some aspects, Omni-TM may be integrated in the TCP/IP model. Based on the design structure illustrated in FIG. 1 and described herein, Omni-TM may be implemented as a shim layer 302 inside the transport layer (between the applications and the traditional TCP/User Datagram Protocol (UDP)), as shown in FIG. 3. FIG. 3 illustrates an embodiment of the Omni-TM in a protocol stack, according to the present disclosure. The protocol stack 300 may a protocol stack at the source host 102. The protocol stack 300 may comprise one or more of: an application layer 301, an Omni-TM layer 302, a TCP layer 303, a UDP layer 304 and lower layers 305. In some embodiments, Omni-TM 302 may coexist with the traditional TCP 303 and UDP 304 layers. In some embodiments, Omni-TM 302 may be designed with the consideration of bypassing TCP and UDP (shown as optional in dashed lines) as it allows the host to define its transmission rate based on its demand. Hence, Omni-TM may replace the existing transport protocols.

Figure 4:
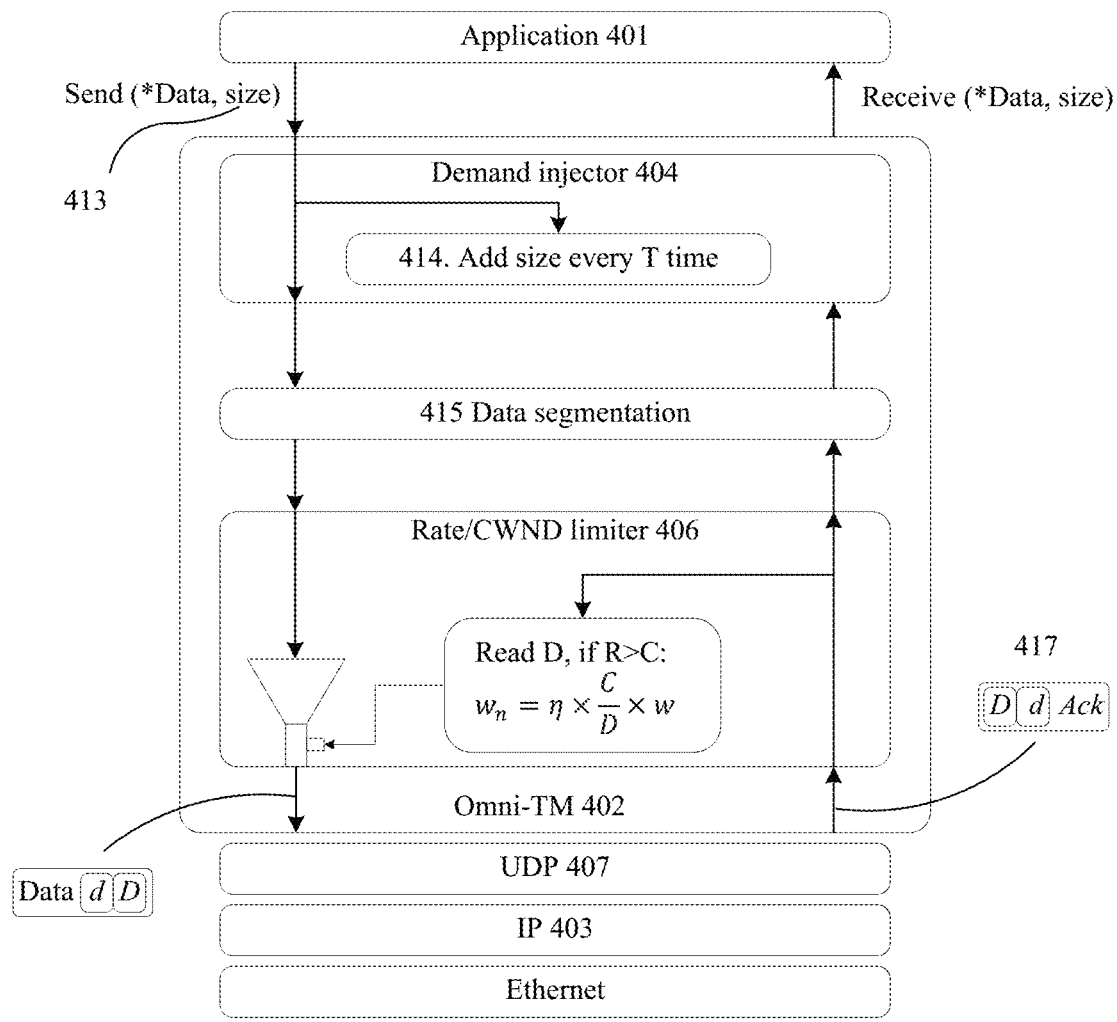
FIG. 4 illustrates an enhanced transport layer, according to an aspect.

FIG. 4 illustrates an embodiment of an enhanced transport layer, according to the present disclosure. Omni-TM 402 may be implemented, at the host 112 (shown at FIG. 1), as an enhanced transport layer between the application layer 401 and the UDP layer 407, which is above the IP layer 403. The Omni-TM layer 402 may be similar to the Omni-TM 302 (shown at FIG. 3), which may operate independently of or in combination with the TCP and UDP layers (layers 303 and 304 in FIG. 3). According to an aspect, a source host may send its flow demand, d, for the next time period T. The source host, via the Omni-TM layer 402 may add 414 the size of data every T time. The size information 413 may be obtained from the application layer 401. The flow demand may be added to the packet via the demand injector 404 (which may be similar to the demand injector 104 shown at FIG. 1), and the updated packet may then be sent to the data segmentation component 415 of the Omni-TM layer 402. The data segmentation component 415 may perform appropriate segmentation operations and forward the output to the rate/cwnd limiter 406 (which may be similar to the rate/cwnd limiter 106 of FIG. 1). The rate or cwnd limiter 406 may adjust the transmission rate as per the received D in the Ack packet 417. If the received D is greater than 1, then, the source host, via the Omni-TM layer (rate/cwnd limiter 406) may use D to limit the transmission rate according to:

$$r_{new} = \frac{1}{D} \times \frac{d}{T},$$

where $r_{new}$ is the transmission rate for the next cycle or time period (e.g., RTT). The same approach may be followed for cwnd:

$$cwnd_{new} = \frac{1}{D} \times d,$$

where cwnd is in bytes, the same unit as d (since D is unitless).

Figure 5A:
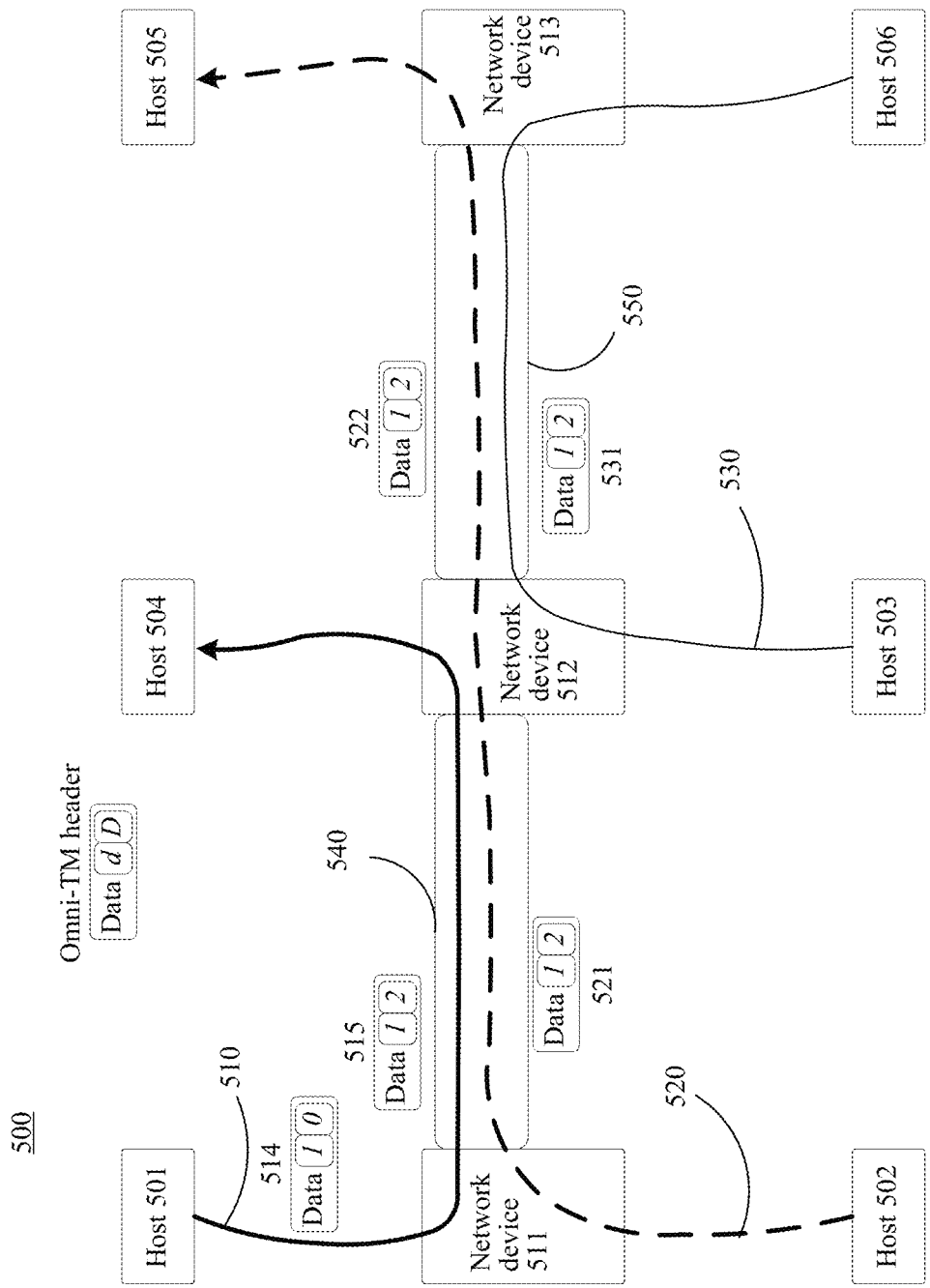
FIG. 5A illustrates a parking lot topology according to an aspect.

According to an aspect, Omni-TM performance with multiple congestion points is described. Networks with multiple congestion points in the same data path introduce fairness challenges for both explicit feedback-based and end-to-end credit-based congestion control protocols. Because Omni-TM provides feedback that represents the demands of active flows, not the bandwidth availability in the network, Omni-TM may not be affected by the cascaded congestion points as long as the demands on a subsequent, e.g., second, congestion point are not larger than the demand on the first congestion point, as illustrated in FIG. 5A for example. FIG. 5A illustrates an embodiment of a parking lot topology 500, according to an aspect of the present disclosure. The topology 500 includes a first flow 510 originating at host 501 and passing through a link 540 (which connects the network device 511 to the network device 512) to host 504. The topology 500 further includes a second flow 520 originating at host 502 passing through the link 540 and link 550 (connecting network device 512 with network device 513) to a host 505. The topology 500 further includes a third flow 530 passing through the link 550 to host 506. According to an aspect, network device 511 may determine the total or aggregated demand, D, at the exit port connected to link 540, based on received flow demands associated with flow 510 (from host 501) and flow 520 (from host 502).

Assuming that each of the hosts 501 and 502, for flows 510 and 520 respectively, request a full link capacity for the next RTT, where d=1, the network device 511 may determine the D to be 2. For example, host 501 may send its flow demand request via packet 514, where the flow demand value, d, is normalized based on the link capacity value indicating 100% link capacity (d=1). The D value may initially be set to '0', and thus at the first congestion point, at network device 511, the determined D value may be used to set the D value in the received packet (as illustrated in packet 515.

Accordingly, the network device 511 may set the D value, in packet 515 associated with flow 510 and the packet 521 associated with flow 520, to 2.

Similarly, at network device 512, the request link capacity for flow 530, received from host 503, may also indicate a full link capacity, where d=1. As noted with respect to network device 511, the requested link capacity for flow 510 is also 1. Accordingly, the aggregated demand, D, at the exit port of the network device 512 connecting to link 550 may be determined, by the network device 512 to also be 2. For the packet associated with flow 520, since the determined D value at network device 512 is less or equal to the D value calculated at network device 511, then the D value for packet 522 associated with flow 520 remains the same as the previous value (e.g., D value in packet 521). For packet 531 associated with flow 530, network device 512 may set the D value to 2. According to an aspect, the D value for packet 531 may be initially set to 0, and at the first congestion point for flow 530, the network device 512 may then set the D value as the determined value being 2.

As may be appreciated, because Omni-TM uses the original flow demands to calculate D, flow 520 (originated from host 502 towards host 505 and depicted with packets 521 and 522) uses the original request from the host. Hence, the aggregated demand D, at second congestion point (network device 512), will be equal to 2 for all flows.

Accordingly, the source hosts associated with each flow may adjust the transmission rate based on the D value that may be returned. The D value for each flow as described may be 2 based on the topology 500. Accordingly, in the next cycle, after T time period (e.g., one RTT), each host may adjust their transmission rate to =C/D=C/2 which leads to fair rate assignments (as illustrated in FIG. 5B). accordingly, Omni-TM may allow for improved link utilization at the next cycle, which is improvement over prior art (e.g., ExpressPass) where the switches limit the credits at each congestion point separately which leads to link underutilization.

Figure 5B:
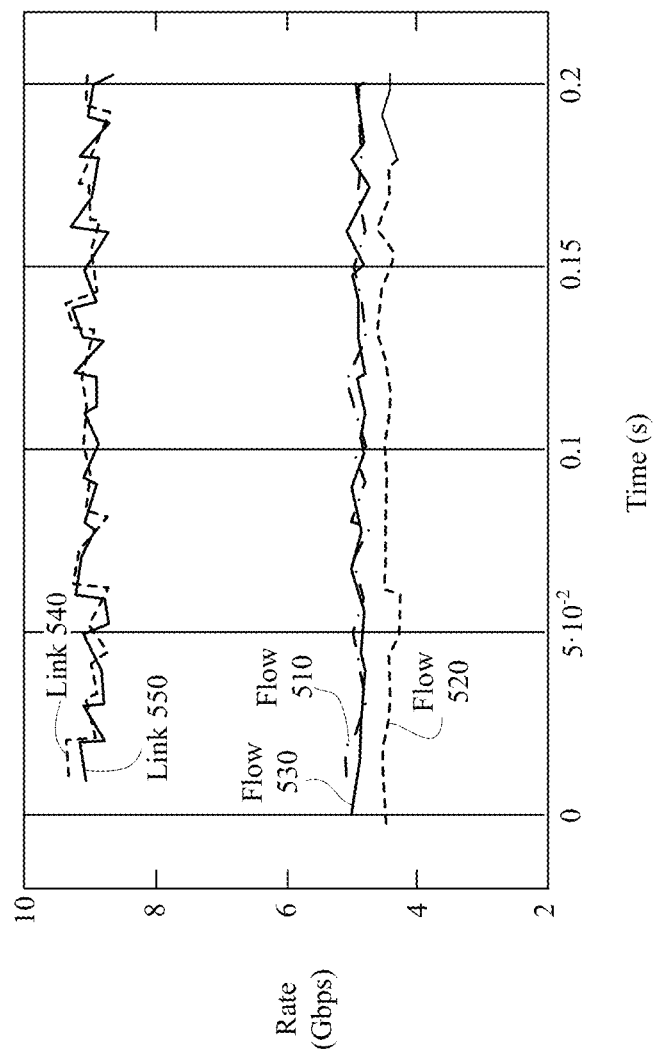
FIG. 5B illustrates transmission rates and link capacities associated with topology of FIG. 5A, according to an aspect.

Simulating the parking lot topology of FIG. 5A using NS-3 simulator results in the transmission diagram illustrated in FIG. 5B. FIG. 5B illustrates an example of transmission rates and link capacities associated with the topology of FIG. 5A, according to the present disclosure. The simulation results are based on setting the link capacities of link 540 and 550 to 10 Gbps. As illustrated, the link capacities or the link utilization of link 540 (connecting network device 511 with network device 512) and link 550 (connecting network device 512 with network device 513) are close to the set rates, being 10 Gbps, as expected. The illustrated link utilization of link 540 and link 550 are based on n factor being set to a value less than 1, resulting in just below 10 Gps. In addition, the transmission rates of the three flows are close to their fair-share (5 Gbps). Although, the transmission rate of flow 520 is slightly less than the transmission rates of flow 530 and 510, the difference is small (e.g., less than 10%, from 4.5 Gbps to 5 Gbps) as illustrated.

On the other hand, when one of the following congestion points, e.g., network device 612 (in FIG. 6) has a higher demand compared to the previous congestion point, e.g., network device 611, Omni-TM may use a link utilization limiting factor, η, to determine D. According to an aspect, the total or aggregated demand, at an exit port of a network device 612 may be determined according to:

$$D = \frac{1}{\eta} \sum_{i=1}^{i=NFlows} d_i,$$

where D is the determined demand value (i.e., the aggregated value), $d_i$ is a flow demand of the one or more flow demands exiting the port at the congestion point (network device 612), n is a link utilization limiting factor; and N flows is the number of the one or more flows to be forwarded through the egress port. The formula clarifies the concept, however, the network device (switch) may not be performing the formula exactly as it does not hold a per-flow state.

Figure 6:
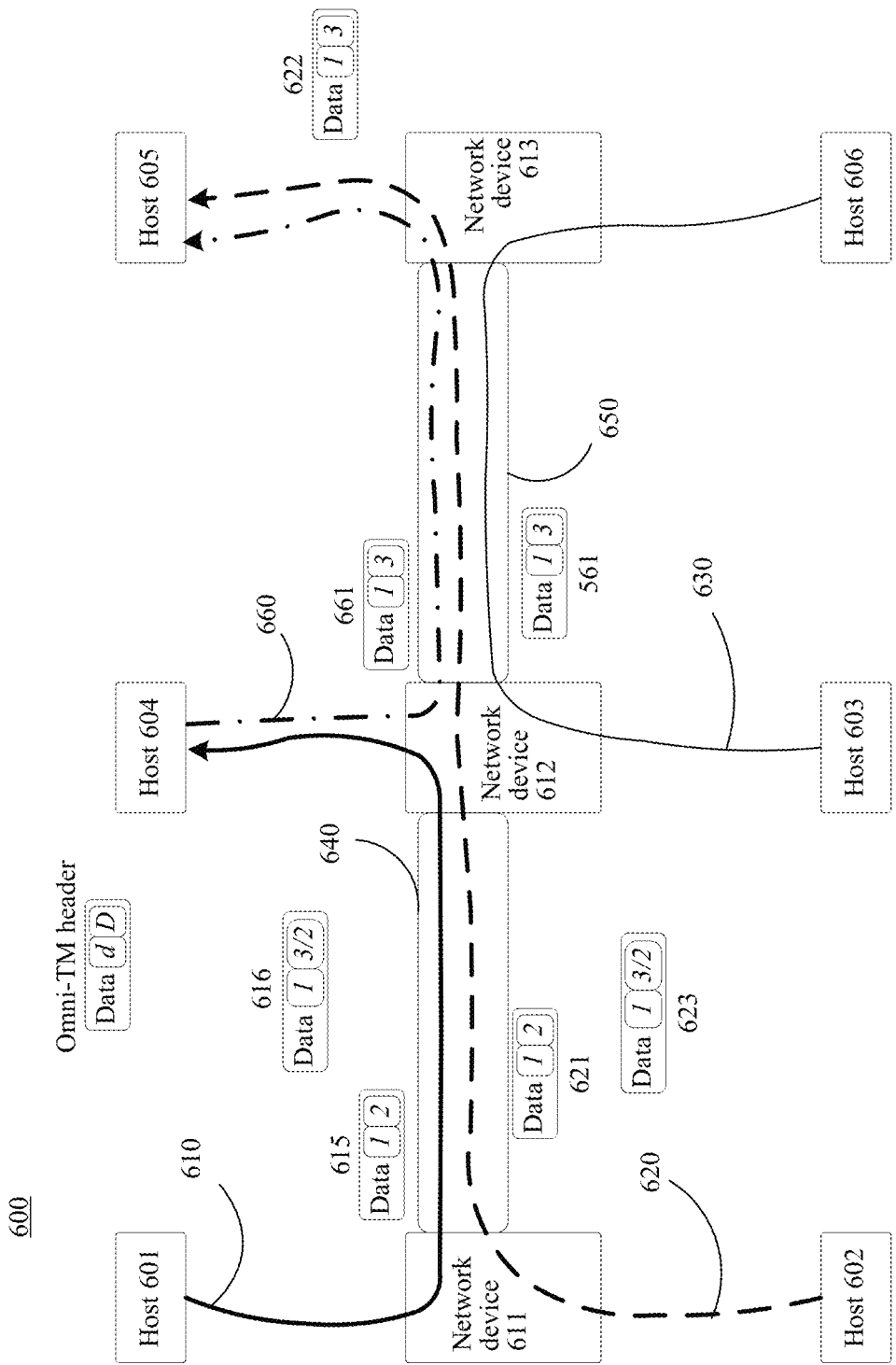
FIG. 6 illustrates a multi-bottleneck affect, according to an aspect

FIG. 6 illustrates a multi-bottleneck affect, according to an aspect. FIG. 6 may be another parking lot topology where a subsequent congestion point, network device 612, has a higher demand than a previous congestion point, network device 611, according to an aspect. The topology 600 may be similar to the topology 500 with the addition of flow 660 which originates at host 604 passing through the link 650 (connecting network device 612 with network device 613) to host 605. Hosts 601, 602, 603, 604, 605, and 606 may be similar to hosts 501, 502, 503, 504, 505, and 506 respectively. Similarly, flows 610, 620 and 630 may be similar to flows 510, 520, and 530 respectively. Further, links 640 and 650 may be similar to links 540 and 550 respectively.

Each of the flows 610, 620, 630 and 660 may request, via their corresponding source hosts, a full link capacity, d=1. Network device 611 may determine a total or aggregate demand value, D, of 2 based on the received flow demands of flows 610 and 620. Accordingly, network device 611 may set the D value in respective packets 615 and 620 as '2'. At network device 612, three flows (flow 620, 630 and 660) are forwarded through an exit port associated with the link 650. The network device 612 may determine, the total or aggregated demand value, D value, at the exit port, as '3' based on the received flow demands of flows 620, 630 and 660. For flows 660 and 630, since network device 612 is the first congestion point that the flows experience, the network device 612 may set their corresponding packets 661 and 561 as '3'. For flow 620, network device 612 is a second congestion point, the first being network device 611. Thus, for flow 620, the network device 612 may compare the determined D value. i.e., being '3', with the value existing in the packet 621, i.e., being set at '2' based on the determination at network device 611. Since the D value at network device 612 is higher, network device 612 may set the D value in packet 622, corresponding to flow 620 and may set the D in packet 622, which corresponds to flow 620, to the higher D value, being '3'.

Accordingly, because of the higher demand in link 650, flows 620, 630, and 660 may receive D=3 (in a returned acknowledgement packet). Based on the received D value, the utilization of the link 640 between network device 611 (e.g., a first switch (SW1)) and network device 612 (e.g., a second switch (SW2)) becomes $$U_{SW1 \to SW2} = \sum_{all\,flows} \frac{C}{D} = \frac{C}{2} + \frac{C}{3} = \frac{5}{6}C = 0.83 \cdot C.$$

As a result, this may cause the link 640 to be underutilized, which may be mitigated as described herein.

As described herein, network devices may use the n factor to limit link utilization. The link utilization limiting factor η may also be used to enhance link utilization in such a case (e.g., link 640). According to an aspect, factor η may be set as follows ($U_{Desired} < \eta < 1/U_{current}$) where $U_{Desired}$ is set to 0.95 (in our experiment), and $U_{current}$ is the calculated link utilization at the egress port. Thus, the network device (e.g., switch) may change its value depending on the link utilization. For example, as the link utilization gets lower, η is increased iteratively to saturate the link. And as the link utilization gets higher, n is decreased iteratively to limit the link utilization to its desired value ($U_{Desired}$=0.95).

In an embodiment, network device 611 may start increasing η gradually to $$1\frac{1}{3}$$

after experiencing or becoming aware of the link 640 underutilization (the link underutilization may be consistent for the network device 611 to realize). Thus, network device oil may sets $$D = \frac{2}{4/3} = \frac{3}{2}.$$

Accordingly, network device may set the D value in packets 616 and 623 corresponding to flows 610 and 620 respectively to '3/2'.

At the second congestion point, since network device 612 does not experience link underutilization or overutilization, network device 612 may use the original η=1 to determine D. Accordingly, the network device 612 may determine the D value to be 3 as previously. For each flow, the network device 612 may then compare the determined D value, '3' with the existing value of D. In the case of flow 620, the D value is set by the network device 611 to 3/2 in packet 623. Since the determined D value, '3', at network device 612 is higher than the existing D value for flow 620, network device 612 may then set the D value as 3 in packet 561. The network device 612 may determine the D value according to: D=max ($d_{req}$, pkt. $D_{ND611}$)/η=max (3, 3/2)=3, where the D value at the network device 611 is 3/2 ($D_{ND611}$=3/2) which is calculated at the network device 611. Thus, the link utilization for link 640 at the next stage becomes $$U_{link\,640} = U_{ND611 \to ND612} = \sum_{all\,flows} \frac{C}{D} = \frac{2}{3}C + \frac{1}{3}C = C.$$

Therefore, Omni-TM may allow the network device 611 to gradually increase n to recover available bandwidth.

Omni-TM effect on low-demand flows is described. As may be appreciated, low-rate flows may be sensitive to fairness issues. With respect to low-rate flows, in some aspects, Omni-TM may maintain the additive increase behavior of traditional TCP as shown in Equation (1). Therefore, Omni-TM may perform adequately compared to the traditional TCP in this case. In addition, since low-rate flows have low demand, setting a maximum and a minimum demand to be considered in the calculation at the switch may be beneficial as depicted and described in reference to the Omni-TM design herein. Omni-TM is designed to be flexible enough to fulfill different objectives depending on flow requirements. For example, Omni-TM can be tuned to maximize deadlines satisfaction by setting the demand equals FlowSize/Deadline. Furthermore, Omni-TM can be tuned to optimize the fairness by setting the demand of all flows to link capacity C.

Further examples of Omni-TM are described to illustrate advantages that may be obtained. As illustrated in the examples described herein, one or more flows may request or indicate an applications' demand information, e.g., flow demand, to one or more network devices, which determine the maximum allowed rate per flow. The aggregated demand determined at each of the one or more network devices may be used by the source hosts to adjust a transmission rate of a corresponding flow.

An example is described, in reference to FIGS. 7A, 7B, 7C and 7D to demonstrate how using the applications' demands enables the network devices (e.g., switches, routers) to determine the optimal flow transmission rates and consequently enhance the overall network performance.

Figure 7A:
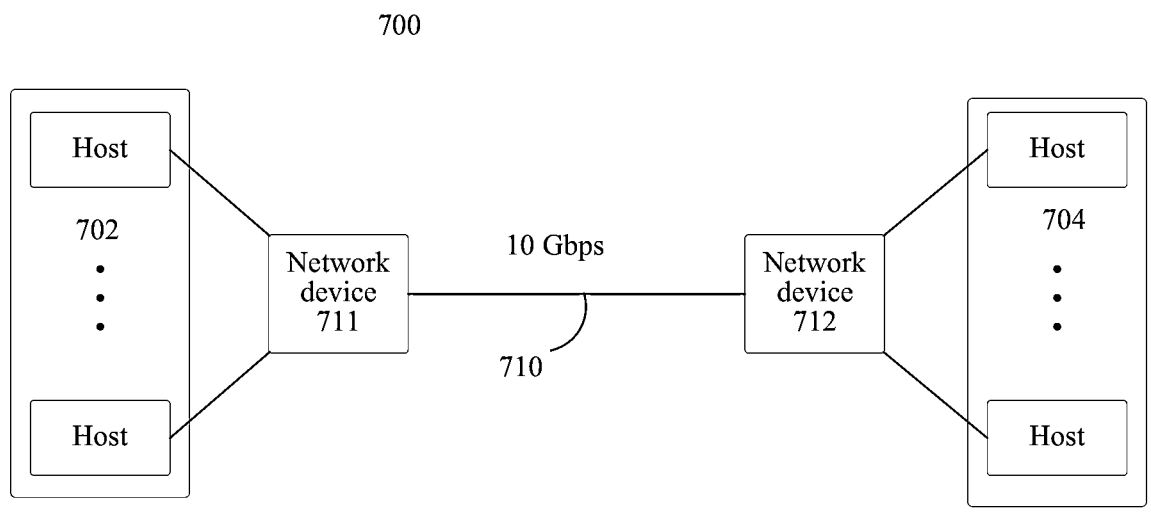
FIG. 7A illustrates a dumbbell topology, according to an aspect.

FIG. 7A illustrates an example of a dumbbell topology, according to an embodiment of the present disclosure. The topology 700 includes a first network device 711 connected to a second network device 712 via link 710. The link 710 may have a 10 Gbps capacity and 120 µs RTT. One or more hosts 702 may use the link 710 to send data to one or more destination hosts 704.

An NS-3 simulator with the dumbbell topology 1100 was used to compare the performance of Omni-TM with Data Center TCP, which is considered as the de facto standard for congestion control inside DCs. The simulation was based on five flows between different pairs of senders 702 and receivers 712, starting 100 milliseconds (ms) apart. Thus, the flows are spaced at 100 ms apart, where each subsequent flow departs 100 ms after a previous flow, and where the first flow departs at an initial set time.

Figure 7B:
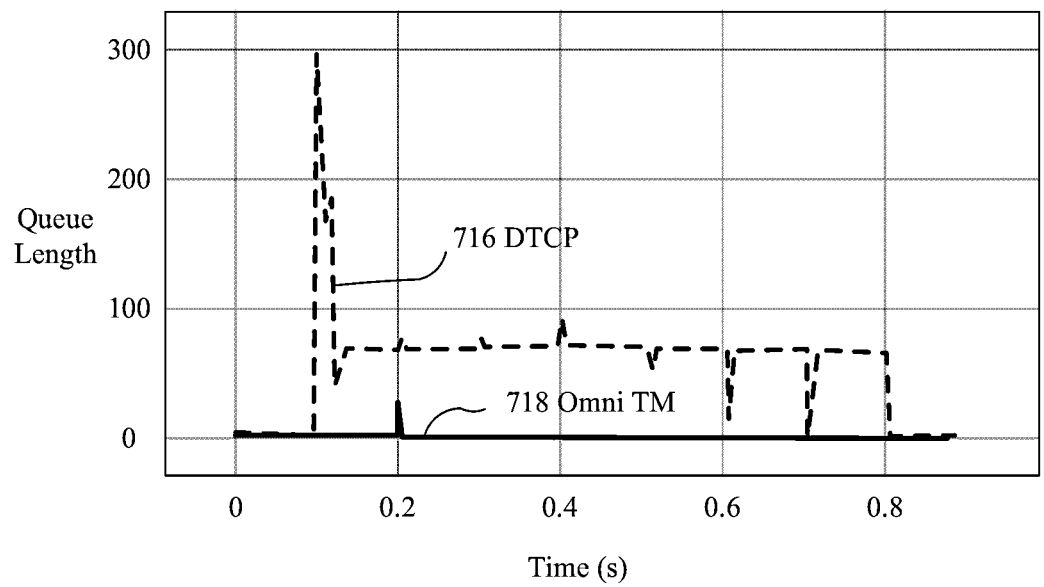
FIG. 7B illustrates a comparison of queue lengths of Omni-TM and data center transmission control protocol (DCTCP), according to an aspect.

FIG. 7B illustrates a comparison of queue lengths of Omni-TM and DTCP, according to an aspect. As illustrated, Omni-TM 718 exhibits a stable, small (near-zero) queues and encounters zero packet loss compared to DCTCP 716 which encountered a total of 247 packet losses. Although DCTCP is shown to be stable in maintaining queue sizes, it maintains queue levels around the threshold (65 in this case), which can impact the FCT of short flows. Such an effect is further investigated as described herein in reference to FIGS. 8A, 8B, 8C and 8D.

Figure 7C:
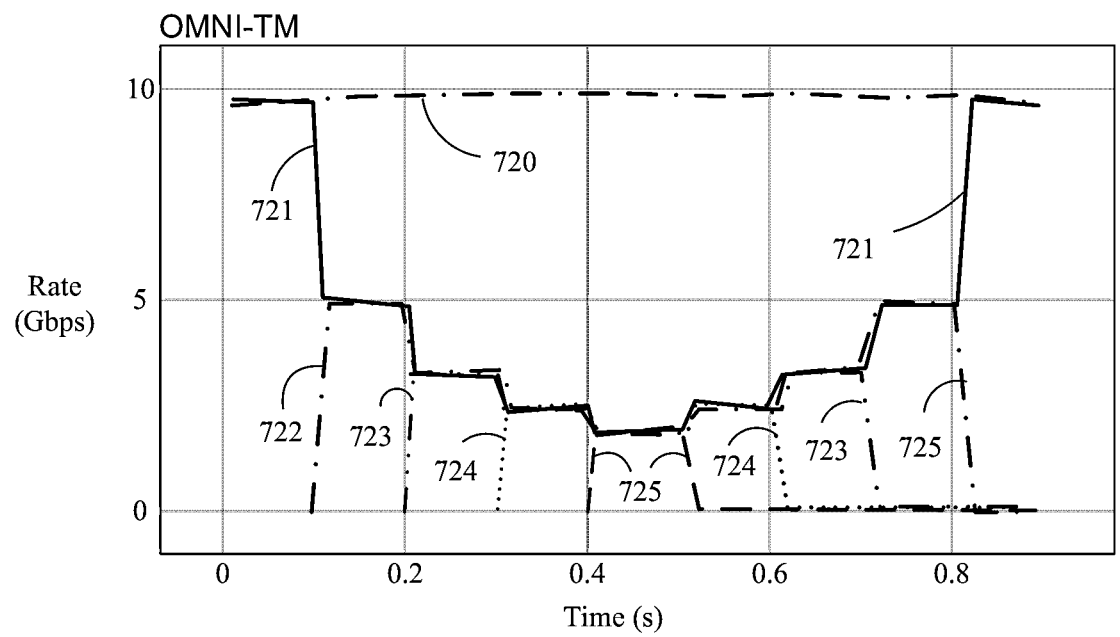
FIG. 7C illustrates change in transmission rates based on Omni-TM, according to an aspect.
Figure 7D:
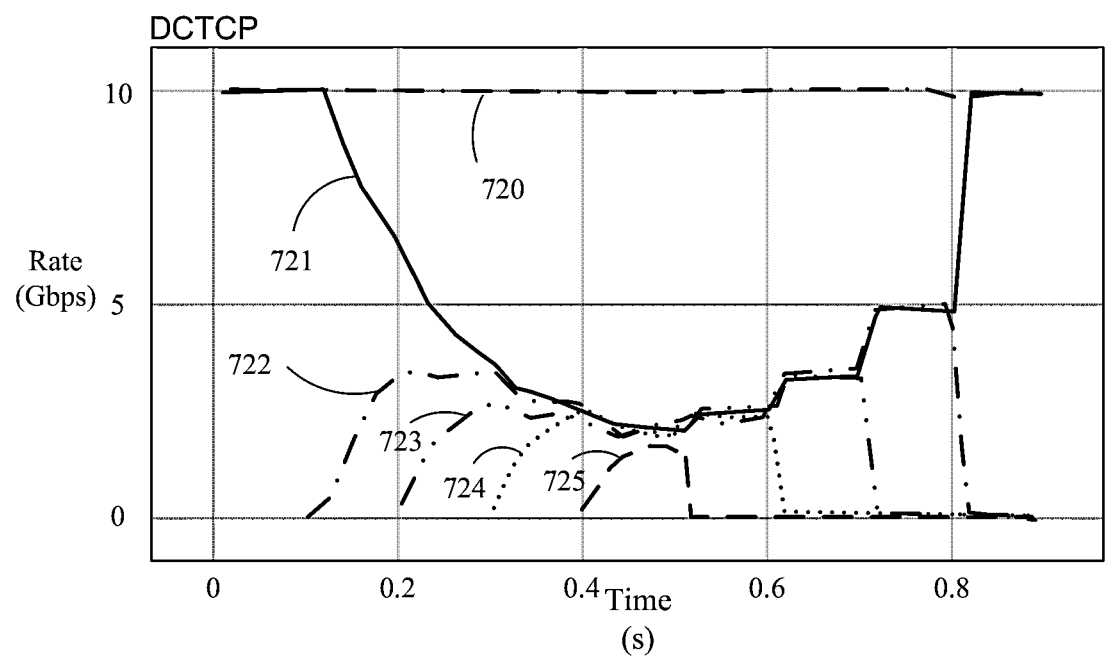
FIG. 7D illustrates change in transmission rates based on DCTCP.

FIG. 7C illustrates change in transmission rates based on Omni-TM, according to an aspect. FIG. 7D illustrates a change in transmission rates based on DCTCP. As described herein, both FIGS. 7C and 7D are based on five flows passing through the link 710, where the first flow departs at time=0, and each 100 ms after, a subsequent flow starts transmission. At the beginning, one flow starts transmission after 0.1 second. Each time a flow starts or finishes transmission, all existing flows may change their transmission rate until they reach their fair share. For example, in each of FIGS. 7C and 7D, flows 721, 722, 723, 724, 725 may start transmission, respectively at time=0 s, 0.1 s, 0.2 s, 0.3 s, and 0.4 s. The flows 721, 722, 723, 724, 725 may finish transmission, respectively at time=0.5 s, 0.6 s, 0.7 s, 0.8 s, and 0.9 s.

In FIG. 7C, each time a flow enters or exits the link 710, the one or more flows in the link may change their transmission rate until the one or more flows reach their fair share. In FIG. 7C, the one or more flows in the link reach their fair share within one period T (e.g., RTT) as described herein. As a result, the lines representing the rates of the one or more flows in the link are shown to overlap each other (indicating the one or more flows reaching their fair share). Each time a flow enters or leaves the link 710, the remaining flows in the link respond in a step-like manner as shown.

In FIG. 7D, each time a flow enters the link 710, the one or more flows in the link (including the flow that entered link) respond in a delayed fashion, at least more than one RTT, in reaching their fair share as illustrated. This delayed response leads to underutilization of the link.

Figure 8A:
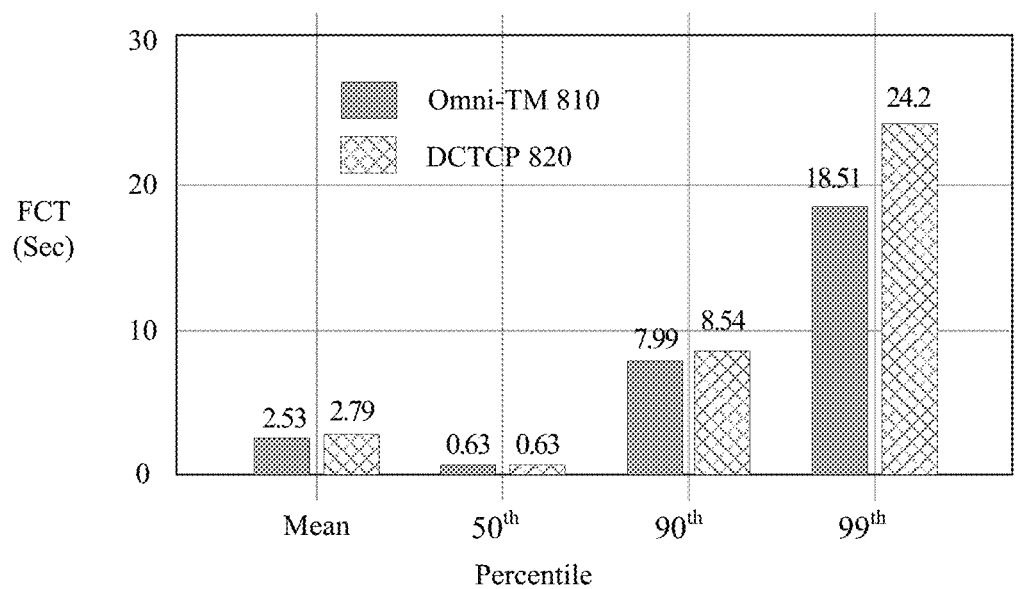
FIGS. 8A, 8B, 8C, and 8D illustrate simulation results of a fat tree topology based on 60%, 70%, 80% and 90% load respectively, according to an aspect.
Figure 8B:
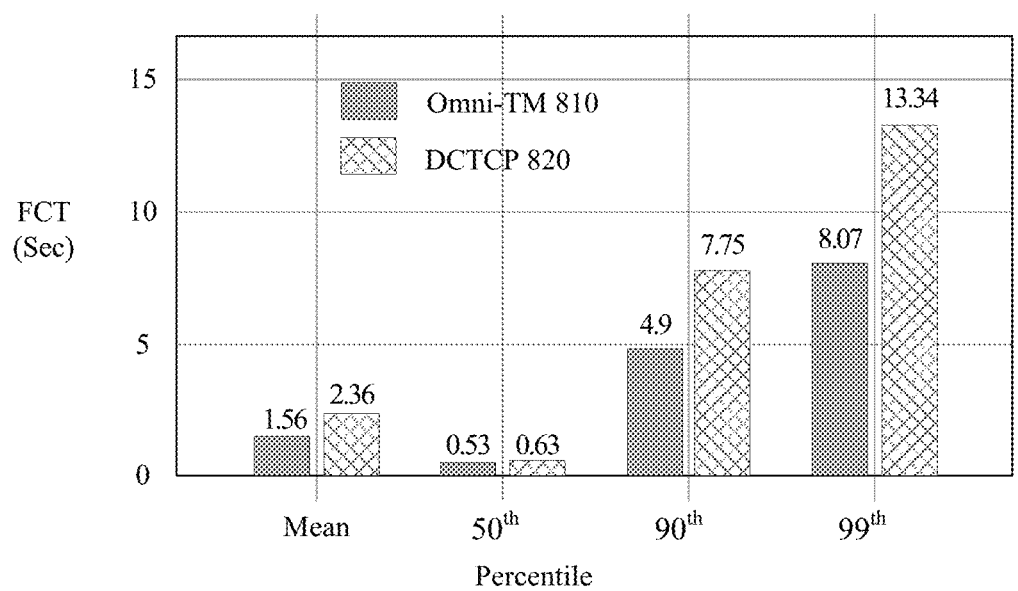
Figure 8C:
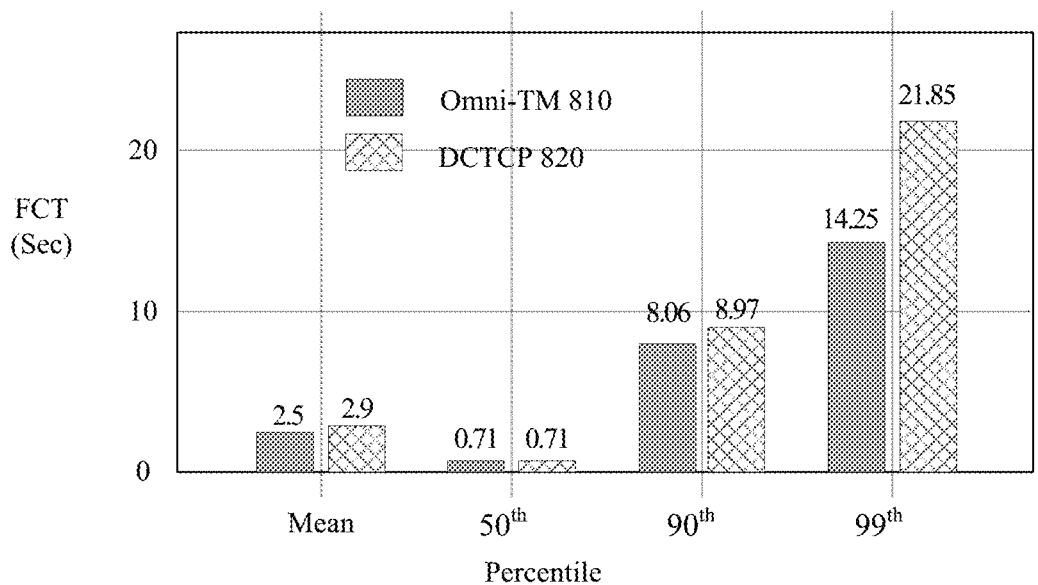
Figure 8D:
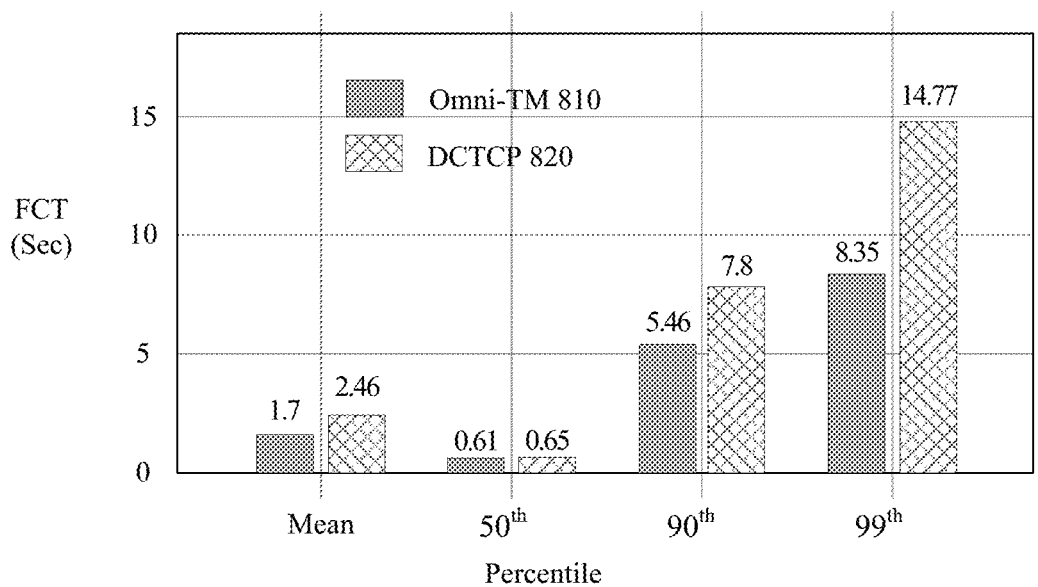

Comparing the convergence time (i.e., the period or time required for flows to reach their fair share) in FIG. 7C (based on Omni-TM) with the convergence time in FIG. 8C (based on DCTCP), Omni-TM is shown to have a better performance, e.g., shorter convergence time. Shorter convergence time may indicate that the network can quickly adapt and reach a balanced state of resource allocation, ensuring fair utilization of link capacity among the flows. Using Omni-TM, flows may reach their fair share within one RTT. On the other hand, using DCTCP may lengthen the convergence time, e.g., require tens of milliseconds for the flows to reach the fair share point, as depicted in FIG. 7D. In addition, Omni-TM saturates the inter-router link and reaches its maximum link capacity which is demonstrated by line 720 (dash-dash-dot line) in FIG. 7C. Line 720 represents the sum of the rates of the five flows 721, 722, 723, 724, and 725.

According to an aspect, another example is described using a realistic workload, namely a web search workload. As described in reference to FIGS. 8A, 8B, 8C, and 8D, using Omni-TM for application-network integration may result in improved FCT.

According to an aspect, an NS-3 simulator is used to simulate a fat tree topology of 144 hosts, 9 Leaf switches, and 4 Spine switches. In the simulation, the links' capacity and latency are set to 10 Gbps and 5 µs respectively. Further, 100,000 flows are generated using the Websearch workload. The simulation is run with different loads; namely 60%, 70%, 80% and 90%. The results based on Omni-TM are compared with those of DCTCP.

FIGS. 8A, 8B, 8C, and 8D illustrate simulation results of a fat tree topology based on 60%, 70%, 80% and 90% load respectively, according to an aspect. As shown, Omni-TM 810 outperforms DCTCP in terms of FCT. One can notice that Omni-TM 810 becomes even more advantageous with higher loads. Such behavior is better demonstrated in FIG. 8D when the load is at 90%, where at mean and at $99^{th}$ percentile, Omni-TM's FCT is about 31% and 43% respectively faster (or shorter) compared to DCTCP's FCT. Shorter FCT indicate that Omni-TM may allow for improved performance and efficiency. Further, sharing applications' demands with network devices according to Omni-TM operation may provide for an improved transport layer in DC networks.

Network devices (e.g., switches, routers, and the like) play a crucial role in transferring state information between the application and the network and are essential components in enabling NAI. According to an aspect, an Omni-TM may be provided which negotiates an improved or optimal transmission rate on the application's transport layer in a distributed and stateless manner. According to an aspect, a methodology may be provided to obtain a lightweight feedback signal from the network devices (e.g., switches, routers, and the like) along the data path to control flow transmission and achieve improved link capacity within one RTT.

As described herein, for example, in reference FIG. 7A to 7D and FIG. 8A to FIG. 8D, Omni-TM may allow for improved traffic control management by maintaining close to zero queue length and high link utilization, and consequently, achieving improved FCT based on a realistic workload compared to existing mechanisms (e.g., DCTCP).

One or more aspects may be applicable to IP switches and routers. One or more aspects may provide for guarantees regarding resource utilization, which may be useful for all infrastructure providers, cloud providers, and enterprise network owners.

Existing approaches, e.g., XCP and RCP, may have limitations including requiring complicated calculation at the switches. Further, other approaches, e.g., ExpressPass, pose multiple challenges regarding causing underutilization in case of multi-bottleneck scenario.

In some aspects, an improved signal (e.g., congestion signal including an aggregated demand D) may be generated at a network device (e.g., switch, router) which may be indicated in one or more packets generated by the network device.

According to an aspect, a maximum allowed rate may be assigned for all active flows in one shot (e.g., within one RTT or time period) which may allow for improved or maximized link utilization. Whereas, traditional approaches iteratively increase cwnd to reach a useful utilization.

In some aspects, an enhanced congestion signal may be provided that can replace existing signal from the switches. The enhanced congestion signal may allow for improved or better congestion measurement.

FIG. 9 illustrates a method by a network device, according to an aspect. The method 900 may be performed by a network device (e.g., 112, 511, 512, 513, 611, 612, 613, 1100) having an egress port. The method 900 may include receiving 901 one or more data packets corresponding to one or more flows to be forwarded through the egress port of the network device. The network device may receive the one or more data packets from one or more network devices (e.g., source hosts). Each data packet of the one or more data packets may indicate a flow demand per time period T for a corresponding flow of the one or more flows. The method 900 may further include determining 902 a demand value for the egress port based on the flow demand of the one or more flows. The method 900 may further include sending 903 the one or more data packets through the egress port. Each of one or more data packets may indicate a value for an aggregated demand of the corresponding flow of the one or more flows, The value for the aggregated demand may be based on the determined demand value. The network device may send the one or more data packets to one or more network devices (e.g., destination hosts) corresponding to the one or more flows. The method may allow for improved link utilization and improved resource utilization.

The value for the aggregated demand may be the determined demand value if the determined demand value is greater than an existing value for the aggregated demand in said each packet. The value for the aggregated demand may be the existing value for the aggregated demand in said each packet if the determined demand value is less than or equal to the existing value.

The method 900 may further include receiving one or more acknowledgment (ACK) packets corresponding to the one or more data packets. Each ACK packet may indicate the value for the aggregated demand of the corresponding packet of the one or more data packets. The network device may receive the one or more ACK packets from the one or more destinations hosts. The method may further include sending the one or more ACK packets. The network device may send the one or more ACK packets toward to the one or more source hosts.

Each of the one or more flows may correspond to a different one of the one or more source hosts and the one more destination hosts. The determined demand value may be based on an aggregation of the flow demand of the one or more flows.

The determined demand value may be generated based on:

$$D = \frac{1}{\eta}\sum_{i=1}^{i=NFlows} d_i,$$

where D may be the determined demand value; $d_i$ may be a flow demand of the one or more flow demands; $\eta$ may be a link utilization limiting factor; and N flows may be the number of the one or more flows to be forwarded through the egress port.

Each of the one or more packets may include a field for indicating the value for the aggregated demand. Each of the one more data packets may include a header indicating the flow demand of the corresponding flow of the one or more flows. The header may correspond to a transport mechanism layer of an associated protocol stack. The associated protocol stack may exclude or include one or both of: a transmission control protocol (TCP) layer and a user datagram protocol (UDP) layer.

FIG. 10 illustrates a method by a source host, according to an aspect. The method 1000 may include sending 1001, by a source host, at a first transmission rate at a first time T1, a first data packet of a flow indicating a flow demand corresponding to the flow. The method 1000 may further include receiving 1002, by the source host, an acknowledgment (ACK) packet indicating a value for an aggregated demand of a plurality of flows forwarded through an egress port of a network device, the plurality of flows including the flow, the value determined according to an exponentially weighted moving average based on a plurality of flow demands corresponding to the plurality of flows without keeping a state of the plurality of flows at once at the network device, the plurality of flows including the flow demand.

The flow demand may be a demand for a next (subsequent or future) time period T. The method 1000 may further include sending, by the source host to the network device, at a second transmission rate at a second time T2, a second data packet of the flow. The second transmission rate may be based on the flow demand and the value for the aggregated demand. The second time T2 may be one time period T after the first time T1. The one time period T may be one round trip time (RTT).

The second transmission rate may be determined according to:

$$\text{second transmission rate} = \frac{1}{D} \times \frac{d}{T},$$

where D is the value for the aggregated demand; d is the flow demand; and T is a cycle time based on the one time period T.

Figure 11:
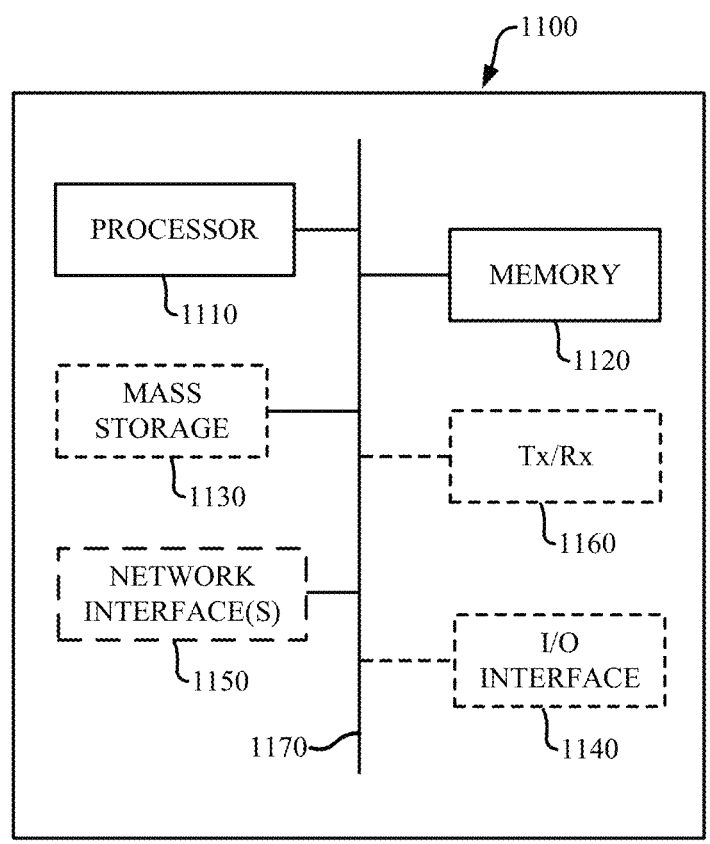
FIG. 11 illustrates an apparatus that may perform any or all of operations of the above methods and features explicitly or implicitly described herein, according to different embodiments of the present invention.

FIG. 11 illustrates an apparatus 1100 that may perform any or all of operations of the above methods and features explicitly or implicitly described herein, according to different aspects of the present disclosure. For example, a computer equipped with network function may be configured as the apparatus 1100. In some aspect, apparatus 1100 can be a device that connects to the network infrastructure over a radio interface, such as a mobile phone, smart phone or other such device that may be classified as user equipment (UE). In some aspects, the apparatus 1100 may be a Machine Type Communications (MTC) device (also referred to as a machine-to-machine (m2m) device), or another such device that may be categorized as a UE despite not providing a direct service to a user. In some aspects, apparatus 1100 may be used to implement one or more aspects described herein. In some embodiments, the apparatus 1100 may be a network device (e.g., a network switch, a router, or the like), a host (e.g., a source host, destination host, or the like) a transmitter, a receiver, or other network entity or components involved in one or more operations described herein.

As shown, the apparatus 1100 may include a processor 1110, such as a Central Processing Unit (CPU) or specialized processors such as a Graphics Processing Unit (GPU) or other such processor unit, memory 1120, non-transitory mass storage 1130, input-output interface 1140, network interface 1150, and a transceiver 1160, all of which are communicatively coupled via bi-directional bus 1170. Transceiver 1160 may include one or multiple antennas According to certain aspects, any or all of the depicted elements may be utilized, or only a subset of the elements. Further, apparatus 1100 may contain multiple instances of certain elements, such as multiple processors, memories, or transceivers. Also, elements of the hardware device may be directly coupled to other elements without the bi-directional bus. Additionally, or alternatively to a processor and memory, other electronics or processing electronics, such as integrated circuits, application specific integrated circuits, field programmable gate arrays, digital circuitry, analog circuitry, chips, dies, multichip modules, substrates or the like, or a combination thereof may be employed for performing the required logical operations.

In some embodiments, the network device may only keep a state of one flow at every single point of time. In some embodiments, the network device determines the aggregated demand value without keeping a state of at least two flows at once. In some embodiments, the network device determines the aggregated demand value without keeping a state of all flows at once.

In some embodiments, a state of a flow may include one or more flow demand and flow indication.

In some embodiments, the network device the determines D using EWMA to avoid keeping a list of all active flows.

In some embodiments, the device may have a counter that gets updated by adding the demand $d_i$ for every flow (e.g., line 205 of method 200). After one time cycle T, the network device may update the average D using EWMA as shown in line 207. Accordingly, the network device may perform the sum of one flow at its time of arrival, without keeping the state of all flows at once.

The memory 1120 may include any type of non-transitory memory such as static random-access memory (SRAM), dynamic random-access memory (DRAM), synchronous DRAM (SDRAM), read-only memory (ROM), any combination of such, or the like. The mass storage element 1130 may include any type of non-transitory storage device, such as a solid-state drive, hard disk drive, a magnetic disk drive, an optical disk drive, USB drive, or any computer program product configured to store data and machine executable program code. According to certain aspects, the memory 1120 or mass storage 1130 may have recorded thereon statements and instructions executable by the processor 1110 for performing any method operations described herein.

As used herein, the term "about" should be read as including variation from the nominal value, for example, a +/−10% variation from the nominal value. It is to be understood that such a variation is always included in a given value provided herein, whether or not it is specifically referred to.

Embodiments of the present invention can be implemented using electronics hardware, software, or a combination thereof. In some embodiments, the invention is implemented by one or multiple computer processors executing program instructions stored in memory. In some embodiments, the invention is implemented partially or fully in hardware, for example using one or more field programmable gate arrays (FPGAs) or application specific integrated circuits (ASICs) to rapidly perform processing operations.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method by a network device having an egress port, the method comprising:
   receiving a plurality of data packets associated with a plurality of flows, the plurality of data packets to be sent through the egress port of the network device, each flow of the plurality of flows having a respective flow demand value representing an amount of data of the respective flow that is to be sent through the egress port in a time period T, each data packet of the plurality of data packets having a header indicating:
   the respective flow demand value; and
   a respective aggregated demand value associated with a respective upstream network device;
   determining, for the time period T, an aggregated demand value for the egress port according to an exponentially weighted moving average based on the flow demand value of each packet of the plurality of packets and without keeping a state of the plurality of flows at once; and
   sending the plurality of data packets through the egress port, each of the plurality of data packets indicating a respective revised aggregated demand value based on the determined aggregated demand value for the egress port and the respective aggregated demand value associated with the respective upstream network device.

2. The method of claim 1, wherein the respective revised aggregated demand value is:
the determined aggregated demand value for the egress port when the determined aggregated demand value for the egress port is greater than the respective aggregated demand value associated with the respective upstream network device that was indicated in the header of the respective data packet upon receipt by the network device; and
otherwise, is the revised aggregated demand value associated with the upstream network device that was indicated in the header of the respective data packet upon receipt by the network device.

3. The method of claim 2 further comprising:
receiving a plurality of acknowledgment (ACK) packets corresponding to the plurality of data packets, each ACK packet indicating the respective revised aggregated demand value that was indicated in the corresponding data packet of the plurality of data packets when sent by the network device; and
sending the plurality of ACK packets.

4. The method of claim 1, wherein the header corresponds to a transport mechanism layer of an associated protocol stack.

5. The method of claim 4, wherein the associated protocol stack excludes or includes one or both of: a transmission control protocol (TCP) layer and a user datagram protocol (UDP) layer.

6. The method of claim 1, wherein each flow of the plurality of flows corresponds to a different one of:
a plurality of source hosts; and
a plurality of destination hosts.

7. The method of claim 1, wherein the determined aggregated demand value for the egress port is updated based on a link utilization factor, η, set according to $U_{Desired} < \eta < 1/U_{current}$, where $U_{Desired}$ is a desired link utilization at the egress port and $U_{current}$ is a current link utilization at the egress port.

8. The method of claim 1, wherein the header of each of the plurality of data packets includes a field for indicating the aggregated demand value.

9. The method of claim 1, wherein determining the aggregated demand value (D) is further based on a sum of normalized flow demands ($D_s$) received during the time period T and a current queue length ($Q_{Len}$) at the egress port.

10. The method of claim 1, wherein the aggregated demand value (D) is calculated according to the formula:

$$D \leftarrow \alpha \cdot \frac{D_s + Q_{Len}/(T \cdot C)}{n} + (1-\alpha) \cdot D,$$

wherein $D_s$ is a sum of normalized flow demands, $Q_{Len}$ is a current queue length at the egress port, T is the time period, C is a link capacity of the egress port, a is a weighting factor, and n is a link utilization factor.

11. The method of claim 1, wherein sending the plurality of data packets through the egress port further comprises:
comparing the determined aggregated demand value for the egress port with an existing aggregated demand value carried within one of the data packets; and
updating the existing aggregated demand value for the egress port in the data packet with the determined aggregated demand value only when the determined aggregated demand value is greater than the existing aggregated demand value.

12. A method comprising:
sending, by a source host, at a first transmission rate at a first time T1, a first data packet of a flow, the first data packet having a header indicating a flow demand value for the flow and an initial aggregated demand value, the flow demand value representing an amount of data of the flow that is to be sent by the source host in a time period T corresponding to the flow; and
receiving, by the source host, an acknowledgment (ACK) packet corresponding to the first data packet, the ACK packet indicating a revised aggregated demand value, wherein:
the revised aggregated demand value was indicated in the header of the first data packet when sent from a downstream network device, the downstream network device being downstream from the source host, the downstream network device having determined the revised aggregated demand value based on a determined aggregated demand value for an egress port of the downstream network device and the initial aggregated demand value,
and
the determined aggregated demand value for the egress port was determined by the downstream network device, for the time period T, according to an exponentially weighted moving average based on the flow demand values indicated in headers of a plurality of data packets associated with a plurality of flows received by the downstream network device, and without said network device keeping a state of the plurality of flows at once.

13. The method of claim 12, wherein the flow demand value is a demand for a next, subsequent, or future time period T.

14. The method of claim 13 wherein the one time period T between the first time T1 and the second time T2 is one round trip time (RTT).

15. The method of claim 14 wherein the second transmission rate is determined according to:

$$\text{second transmission rate} = \frac{1}{D} \times \frac{d}{T},$$

wherein:
D is the revised aggregated demand value;
d is the flow demand; and
T is a cycle time based on the one time period T.

16. The method of claim 13 further comprising:
sending, by the source host, at a second transmission rate at a second time T2, a second data packet of the flow, wherein the second transmission rate is based on the flow demand value indicated in the first data packet and the revised aggregated demand value indicated in the ACK packet, wherein the second time T2 is one time period T after the first time T1.

17. An apparatus comprising:
an input port;
an egress port, the input port configured to receive a plurality of data packets associated with a plurality of flows, the plurality of data packets to be sent through the egress port, each flow of the plurality of flows having a respective flow demand value representing an amount of data of the respective flow that is to be sent through the egress port in a time period T, each data packet of the plurality of data packets having a header indicating:

the respective flow demand value; and a respective aggregated demand value associated with a respective upstream network device;

and processing electronics configured to:

determine, for the time period T, an aggregated demand value for the egress port according to an exponentially weighted moving average based on the flow demand value indicated in the header of each data packet of the plurality of data packets and without keeping a state of the plurality of flows at once; and send the plurality of data packets through the egress port, each of the plurality of data packets sent through the egress port indicating a respective revised aggregated demand value for the egress port based on the determined aggregated demand value for the egress port and the respective aggregated demand value associated with the respective upstream network device.

18. The apparatus of claim 17, wherein the processing electronics are configured to determine the aggregated demand value (D) based on a sum of normalized flow demands (Ds) from the plurality of flows and a current queue length ($Q_{Len}$) at the egress port.

19. The apparatus of claim 17, wherein the processing electronics are configured to:

compare the determined aggregated demand value for the egress port with an existing aggregated demand value carried within one of the data packets; and update the existing aggregated demand value for the egress port in the data packet with the determined aggregated demand value only when the determined aggregated demand value is greater than the existing aggregated demand value.

* * * * *